UNITED STATES PATENT OFFICE.

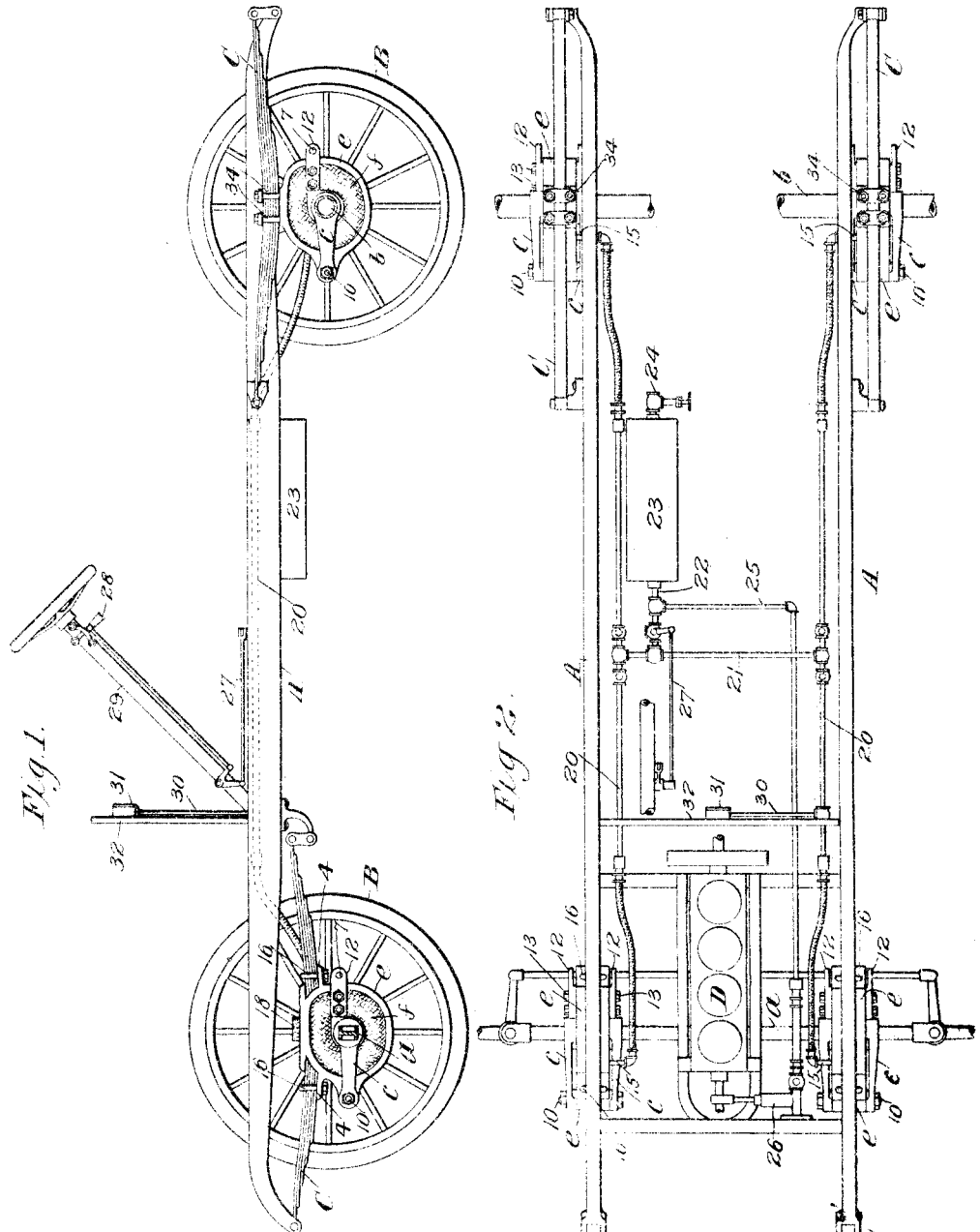

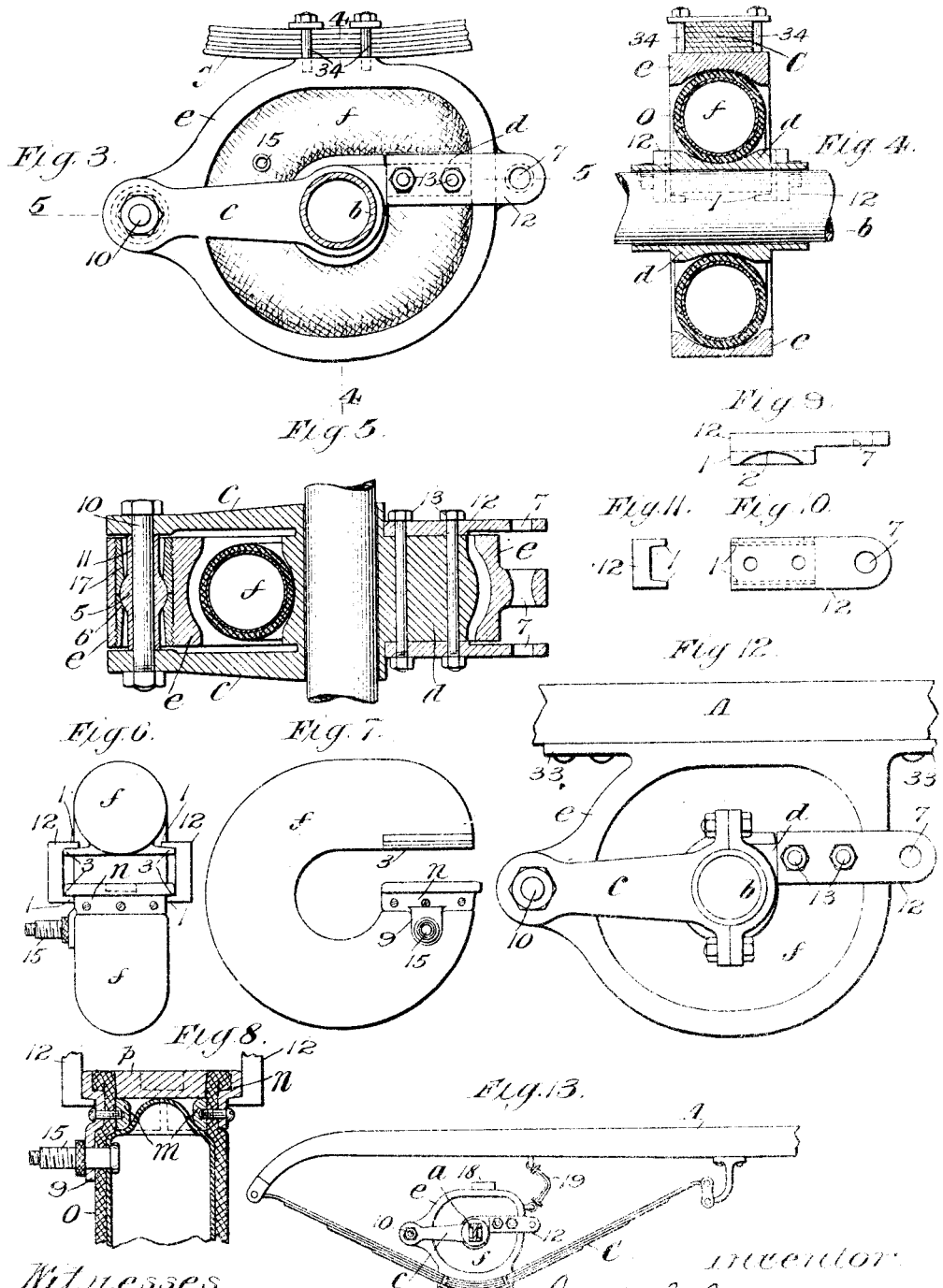

ROSS M. G. PHILLIPS, OF HARRISON, NEW JERSEY, ASSIGNOR OF ONE-HALF TO CHARLES W. CHISHOLM, OF EAST ORANGE, NEW JERSEY.

PNEUMATIC VEHICLE-SPRING.

1,109,146.　　　Specification of Letters Patent.　　　Patented Sept. 1, 1914.

Application filed November 5, 1907. Serial No. 400,862.

*To all whom it may concern:*

Be it known that I, Ross M. G. PHILLIPS, a citizen of the United States, residing at Harrison, county of Hudson, and State of New Jersey, have invented certain new and useful Improvements in Pneumatic Vehicle-Springs, fully described and represented in the following specification and the accompanying drawings, forming a part of the same.

The object of the present invention is to provide an efficient and durable construction of pneumatic spring for automobiles and other vehicles, by which the up and down movement of the frame relatively to the axle shall be efficiently cushioned, and thus secure the desired resiliency and lack of excessive vibration and avoid the objectionable use of pneumatic tires.

A further object of the invention is to combine pneumatic springs with metal spring suspension in such manner as to provide an efficient and durable construction, securing the advantages of both forms of spring and avoiding objections incident to their separate use.

The present invention includes a novel construction and arrangement of pneumatic springs or cushions, acting between the vehicle frame and axle, the pneumatic cushion preferably consisting of a tubular ring carried in a cushion frame which is pivotally mounted on the axle so as to swing vertically, as the cushion is compressed by up and down movement of the frame, and the cushion preferably surrounds or partially surrounds the axle. When combined with the ordinary spring suspension, the cushion frame is attached to the leaf spring, so that the frame is supported on the axle by the metal spring and pneumatic cushion.

The invention includes also the novel features, preferably used, of a cushion in the form of a split ring and an abutment on the axle between the ends of the cushion, so that the cushion may be readily put in place and removed, and a large compression surface is secured with a small axle, a novel arrangement of cushion frame swinging vertically in a support on the axle with a pneumatic spring or other cushion, and certain other specific features of construction and combinations of parts.

For a full understanding of the invention, a detailed description of constructions embodying the invention in preferred forms, will now be given in connection with the accompanying drawings forming a part of this specification, and the features forming the invention then specifically pointed out in the claims.

In the drawings: Figure 1 is a side elevation of the running gear or body frame of an automobile, with the nigh wheels removed and axles sectioned to show the construction; Fig. 2 is a plan view of the same, with parts broken away; Fig. 3 is a side view of the pneumatic springs on the rear wheels, with the axle in section; Fig. 4 is a vertical section on the line 4 of Fig. 3; Fig. 5 is a horizontal section on the line 5 of Fig. 3; Fig. 6 is an edge view of the pneumatic cushion removed from its frame; Fig. 7 is a side view of the same; Fig. 8 is a detail section of one end of the cushion; Figs. 9, 10 and 11 show the cushion clips in detail; Fig. 12 is a side view showing the pneumatic cushion used without the metal spring suspension; Fig. 13 is a view similar to Fig. 1, showing a modified combination of pneumatic cushion and spring suspension.

Referring to said drawings, and especially to Figs. 1 to 10, A is the vehicle frame, B the wheels, C the leaf springs such as used in ordinary spring suspension, combined with my pneumatic springs, and D the engine, all of which parts may be of any suitable construction. The wheels B are mounted in any common or suitable manner on the front and rear axles *a*, *b*, the front axle *a* being shown as of the common I-form, and the rear axle as tubular, but this is immaterial.

Referring now to the parts especially embodying the present invention, the axles are each provided at opposite ends, near the wheels, with pneumatic springs or cushions, which are all preferably of the same construction, so that a description of one will apply to all. Upon the axle or axle casing, shown in Figs. 3 to 5 as the rear axle *b*, and preferably loose on the axle so as to permit a slight rocking movement longitudinally of the axle, although it may be rigidly secured to or formed with the axle or axle-casing and preferably will be so secured on the front axle, is the cushion support, which consists, in the form shown, of two separated arms $c$ projecting in line on one side of the axle, and an arm $d$ on the other side of the axle opposite the space the space between the arms $c$. The cushion frame $e$ consists of a metal frame inclosing the axle and pivotally mounted on one side of the axle on bolt 10 connecting the outer ends of the arms $c$, metal bushion 11 surrounding the bolt as a support for the frame $e$, and acting as a spacer between the arms $c$, so that the latter may be set up rigidly against the bushing, leaving the frame $e$ free to turn on the bushing. On the other side of the axle the frame $e$ extends around the arm $d$, being separated therefrom sufficiently to allow the frame to swing up and down on bolt 10, and the frame is held in position longitudinally of the axle and guided by clips 12 on opposite sides of the arm $d$ secured in place by bolts 13, these clips 12, as shown in Fig. 10, being provided with lugs 1 for a purpose hereafter explained, and preferably having curved surfaces 2 corresponding to the tubular cushion. Within the frame $e$, and extending about the axle from the opposite sides of the arm $d$, is the pneumatic cushion or spring $f$, which is preferably round elastic air tube, forming a split ring of nearly a complete circle, but leaving an opening at one side of the circle between the ends of the tube to receive the arm $d$. The cushion can thus be readily removed and replaced about the axle, and the arm $d$ gives large compression surface with a small axle, while ample expansion space is secured with a tube of reasonable size. The clips 12 not only act to hold the frame $e$ in position and guide it in its vertical movements, but also coact with frame $e$ to hold the axle in position longitudinally in relation to the spring C and cushion frame $e$, the same result being secured on the opposite side of the axle by the arms $c$. This holding of the axle and cushion frame in position longitudinally of the axle is important, and, in itself, forms a specific feature of the invention. As shown, the cushion has one of its ends tangential to the inner periphery of the ring. This feature is not essential to the invention considered broadly, but is preferable, and such a construction forms a specific feature of the invention. Such a cushion is easier to insert in place over the axle or support, and it provides a large continuous pressure surface in the same plane, which may be extended as desired, by enlarging this end of the cushion and the arm $d$.
The ends of the tube are closed and the cushion may be secured in place by any suitable means. A simple and efficient means is shown, in which the opposite ends of the cushion have flanges 3, formed of metal, leather or other suitable material over which project the lugs or clips 12, so as to clamp the ends of the cushion upon the opposite sides of the arm $d$, as the bolts 13 are tightened up. The cushion preferably has a removable inner tube with cover of canvas or suitable material, and there is shown in Figs. 6 to 8 a simple and efficient means for closing the open end of the cover and providing the flanges 3. In this construction, the end of the cover is clamped between inner and outer split metal rings $m$, $n$, which are pressed together on the cover by screws, the cover $o$ preferably having a beaded edge. The outer ring $n$ carries the flange 3, engaged by lugs 1 on clips 12. The valve stem 15 passes through a lug 9 on the ring $n$, to the inner tube. A plug $p$ is preferably used to close the end of the cover and hold the end of the inner tube against blowing out against the arm $d$. The valve stem may be at another point of the cushion, and is so shown in the other figures, but it is preferably near the end of the cushion, as shown in Figs. 6 to 8, as the expansion movement is less.

It is important that vertical rocking of the cushion frame longitudinally of the axle be permitted to prevent binding, and secure the freedom of cushioning movement desired. This may be secured by looseness of the cushion support on the rear axle, as above described, but with the pivoted cushion frame, it is desirable that the cushion frame be mounted so as to permit this rocking movement in the support. In the construction shown, the bushing 11 on which the frame $e$ turns is provided with a spherical central bearing 5 entering concaves 6 in a removable bearing sleeve 17 secured to the frame $e$. Clearance between the frame $e$ and arms $c$ and clips 12 is provided, as shown, so as to permit this rocking movement. This pivotal mounting of the cushion frame will be used with the support $c$, $d$ rigid on the front axle, but preferably both provisions for the rocking movement will be used together on the rear axle.

The pneumatic cushion or spring of the front wheels is shown as secured to the metal spring C by clips 16 and ears 4 on the cushion frame, the springs being half springs so as to permit the frame to be dropped as low as possible, and the cushion frame on the rear wheel by studs 34 on the cushion frame and the usual clamping plates and bolts. Other suitable means may be used. The front springs C and cushions are beneath the frame side bars, but the rear springs and cushions are carried outside the frame, so that the frame may be dropped between the springs C. The cushion is shown as provided with a block or buffer, preferably of yielding material, 18, on the top, which may be struck by the frame A on excess movement downward of the latter, and act as a shock absorber, but this will usually not be found necessary.

Provision is preferably made for supporting the cushion frame on the cushion support independently of the cushion, so as to cut the pneumatic cushion out in case of accident to the cushion, thus permitting the vehicle to be used without injury. In the construction shown, the cushion frame $e$ and the clips 12 are provided with bolt holes 7 to receive a bolt, inserted when it is desired to use the construction independently of the cushion. The bolt-hole 7 in the frame $e$ preferably has a convex bearing surface as shown, so as to permit slight sidewise rocking of the frame on the bolt.

The pneumatic springs or cushions may be supplied with air and the pressure equalized and adjusted in any suitable manner, but preferably the four cushions will be connected, and the supply of air thereto and pressure therein be controlled by the driver. In the construction shown, the stems 15 of the cushions are connected by pipes 20 having flexible portions and extending between the cushions on the same side of the vehicle, these pipes being connected by a cross pipe 21, which is connected by pipe 22 to an air tank 23 provided with a relief valve 24, and connected by pipe 25 to an air pump 26 of any suitable form operated from the engine D. The pipe 22 is provided between the pipe 25 and the cross pipe 21 with a three-way cock, which is connected by links 27 to handle 28 on the steering post 29, so that the driver may shift this three-way valve so as to open the pneumatic cushions to the atmosphere, for reduction of pressure, or to the air tank 23, for increase of pressure, or close the cushions. The pipe 20 is preferably connected through pipe 30 to a gage 31 on the dash-board 32, to indicate the pressure to the driver. Each of the pipes 20 is preferably provided with a cock, by which any cushion may be cut out of the system for repair or renewal, these cocks being normally open.

While the pneumatic cushions or springs are preferably combined with the metal spring suspension, as shown in Figs. 1 to 10, they may be applied otherwise. In Fig. 12 I have shown a construction similar to that shown in Figs. 1 to 10, except that the cushion frames $e$ are secured directly to the underside of the running gear frame A, the frames $e$ being shown as secured by ears 33 bolted to the underside of the frame A. In this construction, also, the arms $c$, $d$, forming the cushion support, instead of being formed in one piece, as shown in Figs. 1 to 10, are shown as made in two parts clamped together by ears and bolts upon the axle or axle-casing, which will form a cheap and convenient method of attachment where it is desired to apply the pneumatic cushions to vehicles after manufacture. In this case, the rocking movement of the cushion frame on the bolt 10 will be relied on for freedom of cushioning movement.

In Fig. 13, there is shown a construction similar to that of Figs. 1 to 10, except that the metal spring C is dropped below the axle, and the cushion frame $e$ mounted on the top of the spring. This figure shows also a flexible strap 19 connecting the cushion frame to the vehicle frame A, so that the strap swings the cushion frame upward and compresses the cushion below the axle to form a shock absorber, on excess upward movement of the frame A. The construction shown constitutes a very simple, efficient and durable pneumatic spring, in which the frame is efficiently cushioned both on its up and down movement. While the pivoting of the cushion frame to swing vertically is important, the provision for rocking movement longitudinally of the shaft may be used in constructions in which the vertical movement of the cushion frame is otherwise secured. The pivoting of the cushion for vertical movement may be applied also to pneumatic springs or other cushions not acting on both up and down movements of the vehicle frame, and such use is within the invention. In combination with the spring suspension an important function is secured, in that the cushion prevents the whip-lash motion of the metal spring, which is taken up by the cushion. The advantages of the metal spring are thus secured in addition to the advantages of the pneumatic spring or cushion, and the objectionable features of the spring suspension when used with pneumatic tires, are avoided. It is found in practice, also, that with the pneumatic springs or cushions, acting on the upward and downward movement of the frame, there is less liability of raising the wheels of the vehicle off the ground, thus reducing the liability to jump and skidding of the vehicle, as compared with the use of pneumatic tires.

While the arrangement shown, in which the cushion lies above and below the axle is preferred, the broader features of the invention may be embodied in other constructions. Thus, the arrangement shown may be reversed and the frame $e$ carried by the axle, and the vehicle frame or its leaf spring attached to a stud corresponding to the axle $b$ or otherwise to the parts $c$, $d$, so that the parts $c$, $d$, with the cushion, swing up and down on the bolt 10. The frame $e$ will then form the abutments for the cushion on its upward and downward compression. In such construction, the frame $c$ may be mounted on the axle in any suitable manner and in any desired position. Many other modifications may be made in the construction and arrangement of parts while retaining the invention defined by the claims. Certain features of the invention, including the split ring pneumatic cushion, and the pivoted cushion frame with a pneumatic or other cushion are applicable to other uses than in vehicles, and are claimed broadly.

What is claimed is:—

1. In a pneumatic vehicle spring, a pneumatic cushion acting between the vehicle frame and the axle, a cushion frame, and means for compressing the cushion by the movement of the vehicle frame to cushion both the up and down movement of the frame including a pivotal mounting between the cushion frame and axle to permit the cushion frame to rock longitudinally of the axle to secure freedom of cushioning movement.

2. In a pneumatic vehicle spring, a pneumatic cushion acting between the vehicle frame and axle, in combination with a metal spring on which the vehicle frame is mounted, a cushion frame secured to the metal spring, and means for compressing the cushion by the movement of the vehicle frame to cushion both the up and down movement of the frame including a pivotal mounting between the cushion frame and axle to permit the cushion frame to rock longitudinally of the axle to secure freedom of cushioning movement.

3. In a pneumatic vehicle spring, the combination with the axle and vehicle frame, of a cushion support on the axle, a cushion frame mounted to move vertically in said support, a pneumatic cushion carried by said frame, said frame and support being arranged to compress the cushion on both upward and downward movement of the cushion frame, and a pivotal mounting for the cushion frame permitting the cushion frame to rock longitudinally of the axle to secure freedom of cushioning movement, and supporting connections between the vehicle frame and cushion frame.

4. In a vehicle spring, the combination with the axle and vehicle frame, of a cushion support on the axle, a cushion frame pivoted in said support to swing vertically, a cushion carried by said frame, said frame and support being arranged to compress the cushion on both upward and downward movement of the cushion frame, and supporting connections between the vehicle frame and cushion frame.

5. In a vehicle spring, the combination with the axle and vehicle frame, of a cushion support on the axle, a cushion frame pivoted in said support to swing vertically, a cushion carried by said frame, said frame and support being arranged to compress the cushion on both upward and downward movement of the cushion frame, and to permit the cushion frame to rock longitudinally of the axle to secure freedom of cushioning movement, and supporting connections between the vehicle frame and cushion frame.

6. In a vehicle spring, the combination with the axle and vehicle frame, of a cushion support on the axle, a cushion frame pivoted in said support to swing vertically, a cushion carried by said frame, said frame and support being arranged to compress the cushion on both upward and downward movement of the cushion frame, and a metal spring on which the vehicle frame is mounted and to which the cushion frame is secured.

7. In a vehicle spring, the combination with the axle, of a cushion support on the axle, a cushion frame pivoted in the support to permit vertical swinging movement between the cushion frame and axle transversely to the axle, and a cushion in said frame.

8. In a pneumatic spring, the combination with a fixed cushion support, of a cushion frame pivoted in the support to swing vertically, a pneumatic cushion in said frame, and guides permitting rocking movement of the frame longitudinally of the axle.

9. The combination with the axle and a cushion support on the axle held against swinging transversely to the axle during cushioning, of a cushion supported in said cushion support and pivotally mounted in the cushion support to swing transversely to the axle.

10. A pneumatic spring consisting of a pneumatic cushion forming a split ring and having its closed ends provided with flanges for securing the ends of the spring to a support inclosed by the spring.

11. In a pneumatic spring, the combination with the axle and a pneumatic cushion forming a split ring, of a cushion support inclosed by the ring and an abutment between the ends of the ring.

12. The combination with a pneumatic cushion forming a split ring, of a cushion support inclosed by the ring, and a cushion frame pivoted in the support.

13. The combination with a pneumatic cushion forming a split ring, of a cushion support inclosed by the ring and having an abutment between the ends of the ring.

14. The combination with a pneumatic cushion forming a split ring, of a cushion support inclosed by the ring and having an abutment between the ends of the ring, and clips for securing the ends of the ring to the abutment.

15. The combination with the cushion support, of the cushion frame, tubular cushion ring *f* in the frame forming a split ring, flanges on the ends of the ring, and clips securing the flanges to the support.

16. The combination with the cushion support, of the cushion frame *e* pivoted in said support, and tubular pneumatic cushion *f* in said frame forming a split ring.

17. The combination of arms *c*, cushion frame *e* pivoted in and between said arms, arm *d* opposite the space between the arms, and tubular pneumatic cushion *f* in said frame forming a split ring and having its ends separated by the arm *d*.

18. The combination with the axle and cushion support thereon, of the cushion frame *e* pivoted in said support to swing vertically, tubular pneumatic cushion *f* in said frame extending about the axle, and semi-elliptical spring C secured to the cushion frame and on which the vehicle frame is mounted.

19. The combination of arms *c*, cushion frame *e* pivoted in said arms by spherical bearing 5, and a cushion in said frame.

20. The pneumatic cushion *f* forming a split ring with one of the ends of the ring tangential to the inner periphery of the ring.

21. The pneumatic cushion *f* forming a split ring with the ends of the ring provided with attaching devices securing them to an abutment between the ends of the ring.

22. The combination with a fixed cushion support, of the cushion frame *e* pivoted in said support, and a cushion between said frame and support.

23. The combination with a fixed cushion support, of the cushion frame *e* pivoted in said support to swing transversely to and longitudinally of said support, and a cushion between said frame and support.

24. The combination with a vehicle axle, of a cushion support on the axle, cushion frame *e* inclosing the support and axle and pivoted to swing vertically, and a cushion between said frame and axle.

25. The combination with a vehicle axle, of arms *c* rigid thereon, a cushion frame supported in said arms and pivoted to swing vertically, and a cushion between the frame and axle.

26. The combination with a vehicle axle, of arms *c* thereon, a cushion frame pivoted in said arms to swing vertically and having a pivotal mounting permitting the frame to rock longitudinally of the axle, and a cushion between the frame and axle.

27. The combination with a vehicle axle, of arms *c*, *d* thereon, cushion frame *e* pivoted in said arms *c* to swing vertically and inclosing arm *d* and the axle, cushion frame guides on arm *d*, and a cushion between the frame and axle.

28. The combination with a cushion support, of a cushion frame pivoted in said support and extending on opposite sides of the support and cushioning means between said frame and opposite sides of said support for cushioning movement of the frame in either direction.

29. The combination with a vehicle axle, of a cushion support on the axle and extending on both sides of the axle, a cushion frame pivoted in said support to swing vertically, and cushioning means between said frame and support extending on the opposite side of the axle from the cushion frame pivot.

30. The combination with a vehicle axle, of a cushion support on the axle, a cushion frame pivoted in said support to swing vertically and extending above and below the support, and cushioning means between said frame and opposite sides of said support adapted to cushion on up and down movements of the frame.

31. The combination with a vehicle axle, of a cushion support on the axle, a cushion frame pivoted in said support to swing vertically and extending above and below the support, said frame being mounted to permit a rocking movement longitudinally of the axle, and cushioning devices between said frame and opposite sides of said support adapted to cushion on up and down movements of the frame.

32. The combination with a vehicle axle, of a cushion support extending on opposite sides of the axle, a cushion frame pivoted in said support at one side of the axle to swing vertically, and cushioning means between said frame and the support on the opposite side of the axle from the frame pivot.

33. The combination with a vehicle axle, of a cushion support extending on opposite sides of the axle, a cushion frame pivoted in said support at one side of the axle and extending above and below the support on the opposite side of the axle, and cushioning means between said frame and the upper and lower sides of the support for cushioning on up and down movements of the frame.

34. The combination with a vehicle axle, of a cushion abutment on the axle, a cushion frame between the vehicle frame and abutment, one of said members extending on opposite sides of the other to prevent relative movement of the axle and cushion frame longitudinally of the axle, and cushioning means between the cushion frame and abutment.

35. The combination with a vehicle axle, of a cushion abutment on one side of the axle, a cushion frame between the vehicle frame and abutment, one of said members extending on opposite sides of the other to prevent relative movement of the axle and cushion frame longitudinally of the axle, means on the opposite side of the axle connecting the axle to the vehicle frame, and cushioning means between the cushion frame and abutment.

36. The combination with a vehicle axle, of a cushion abutment on the axle, a cushion frame between the vehicle frame and axle extending above and below said abutment, one of said members extending on opposite sides of the other to prevent relative movement of the axle and cushion frame longitudinally of the axle, and cushioning means between said frame and the upper and lower sides of said abutment.

In testimony whereof, I have hereunto set my hand, in the presence of two subscribing witnesses.

ROSS M. G. PHILLIPS.

Witnesses:
CLEON J. SAWYER,
T. F. KEHOE.